June 12, 1923.

1,458,776

H. NYE

BALL AND PROCESS FOR MAKING SAME

Filed Jan. 12, 1922

Inventor
Harry Nye
by his Attorneys

Patented June 12, 1923.

1,458,776

UNITED STATES PATENT OFFICE.

HARRY NYE, OF AKRON, OHIO.

BALL AND PROCESS FOR MAKING SAME.

Application filed January 12, 1922. Serial No. 528,610. REISSUED

*To all whom it may concern:*

Be it known that I, HARRY NYE, a citizen of the United States, and resident of Akron, in the county of Summit and State of Ohio, have invented certain new and useful Improvements in Balls and Processes for Making Same, of which the following is a full, clear, and exact description.

An object of my invention is the production of a ball, particularly a base ball, that will be cheap and very durable, that will be affected in only a slight degree by heat, cold or moisture, and will stand hard usage.

Another object is the production of such a ball with a cover that cannot be torn loose from the ball by use.

Another object of my invention is a process for the manufacture of such a ball that can be readily carried out with the minimum of special machinery and at a low cost.

Other objects of the invention will be apparent from the following detailed description and the appended claims.

In the drawings:—

Figure 1:
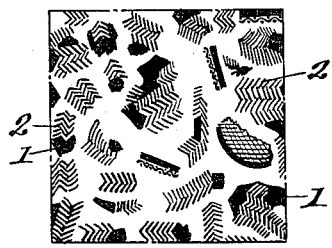
Figure 1 is a diagrammatic view of the scrap from which the body of the ball is made.

This ball is preferably made from trimmings of new stock for tires and is ordinarily composed of about equal parts of rubber and cotton fabric diagrammatically illustrated in Figure 1, the rubber being designated 1 and the cotton fabric 2. These trimmings or scraps are reduced to a pulp-like mass in any suitable manner as by grinding and moistening. The exact manner in which this pulp-like mass is prepared is immaterial so far as my invention is concerned.

Figure 2:
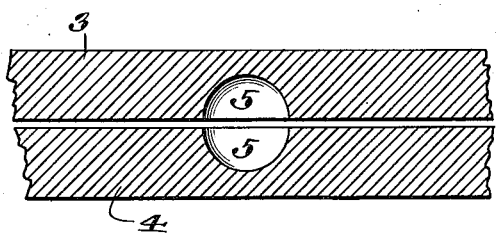
Figure 2 is a partial sectional view of a conventional mold.
Figure 3:
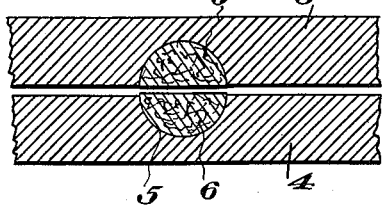
Figure 3 is a similar view with material in place for treatment.
Figure 4:
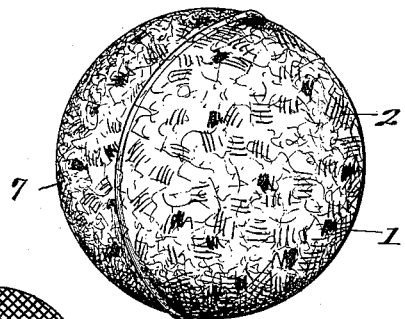
Figure 4 is a perspective view of the ball after the first and partial curing.

A conventional mold is shown in Figure 2 as comprising upper and lower plate members 3 and 4 with registering hemispherical cavities 5 therein. The mold is filled with the pulp-like mass, and preferably somewhat more than filled as shown in Figure 3 where the material 6 is designated. The parts of the mold are pressed together and subjected to heat, which operation can readily be performed in a tire heater for example. This first heating is carried far enough to cement the pulp-like mass together and effect a partial cure. The ball 7 then has the appearance shown in Figure 4, the joining line being evident but the two parts being firmly held together.

Figure 5:
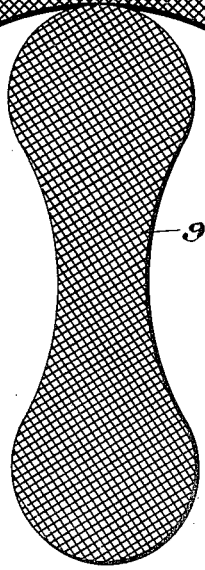
Figure 5 is a plan of the usual two part ball cover.
Figure 6:
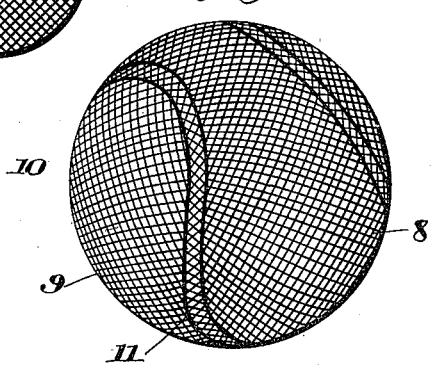
Figure 6 is a perspective view of the completed ball.

As the next step, a cover is cut from pieces of tire material, and this is cut in two pieces of the usual base ball cover form as shown at 8 and 9 in Figure 5. The cover is placed on the ball which is then put back into a mold and subjected to a second heating which acts as a final and complete cure. This operation joins the cover to the body of the ball so firmly that it will not become detached and the finished ball 10 has the appearance shown in Figure 6, the juncture lines 11 of the cover resembling seams.

The second mold should be slightly larger than the first mold because of the added thickness of the cover. The curing process is similar to that used in curing tires and can be carried out by any one familiar with such operations.

This ball can be made in the regulation base ball size and will be nearly the regulation weight. It is very lively and will stand much more use than any base ball as at present manufactured.

I claim as my invention:—

1. A process of making a ball which comprises preparing a pulp-like mass from the trimmings of tire stock, subjecting a quantity of said mass to a partial cure in a spherical mold to form a ball, applying a two-part cover of tire fabric to said ball, and subjecting it to a final cure in a mold, whereby the cover and body are firmly held together.

2. A process of making a ball which comprises preparing a pulp-like mass composed of substantially equal parts of rubber and cotton fabric, subjecting a quantity of said mass to a partial cure in a spherical mold to form a ball, applying a two-part cover of tire fabric to said ball, and subjecting it to a final cure in a mold, whereby the cover is intimately attached to said body.

3. A process of making a ball which comprises preparing a pulp-like mass composed of rubber and fabric, subjecting a quantity of said mass to a partial cure in a mold to form a ball, applying a two-part cover of a fabric containing rubber to the ball, and subjecting it to a final cure in a mold to vulcanize the cover to the body of the ball.

4. A ball comprising a body composed of the trimmings of tire stock and a two-part cover cured thereto.

5. A ball comprising a body composed of the trimmings of tire stock and a two-part cover of tire fabric vulcanized thereto.

6. A ball comprising a body composed of substantially equal parts of rubber and cotton fabric and a two-part cover cured thereto.

In testimony whereof, I have hereunto subscribed my name.

HARRY NYE.